Sept. 3, 1935.     C. W. VOGT     2,013,016
METHOD AND APPARATUS FOR PROCESSING MATERIAL
Filed March 31, 1932     12 Sheets-Sheet 2
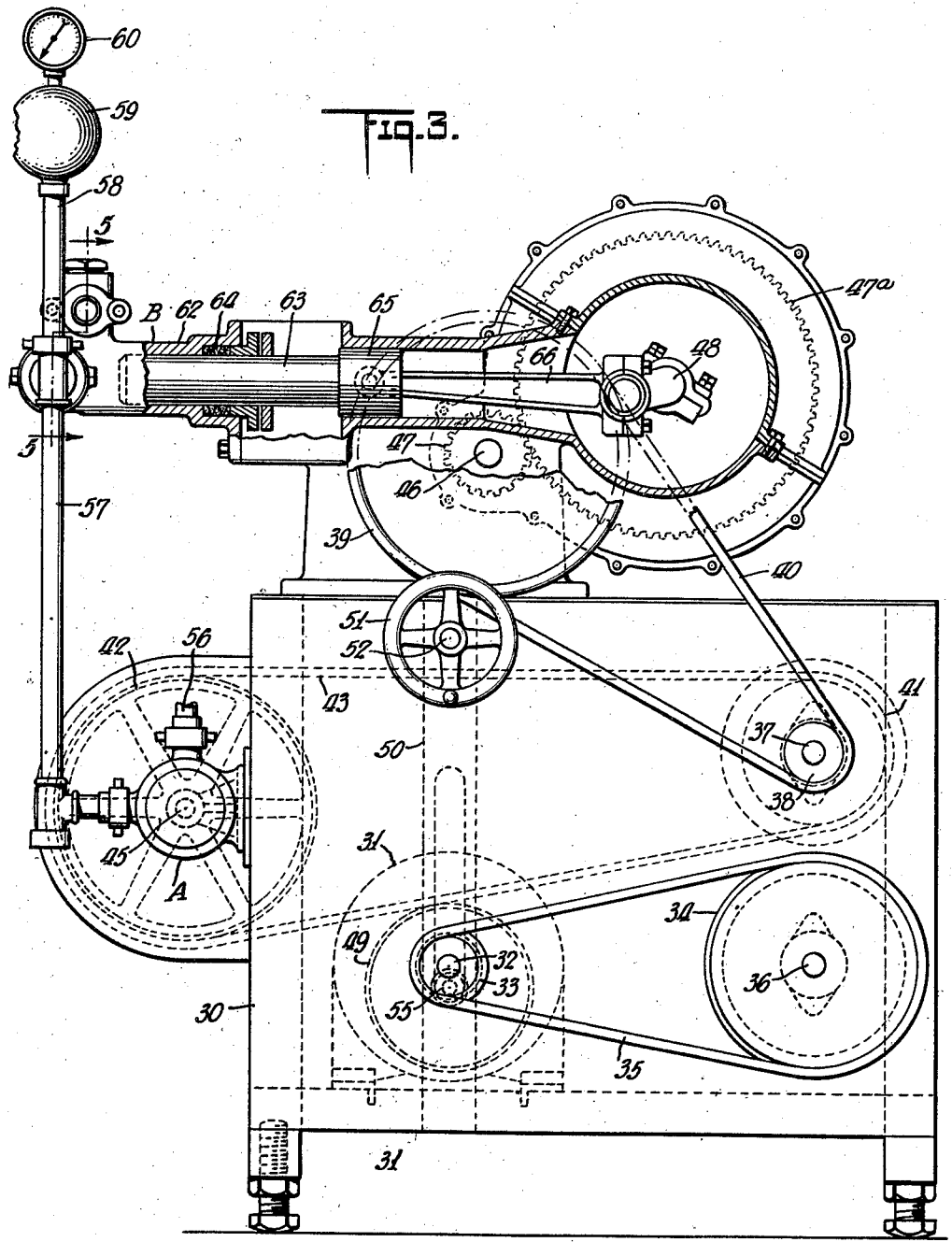
INVENTOR
Clarence W. Vogt
BY
ATTORNEYS Sept. 3, 1935.  C. W. VOGT  2,013,016
METHOD AND APPARATUS FOR PROCESSING MATERIAL
Filed March 31, 1932  12 Sheets-Sheet 3
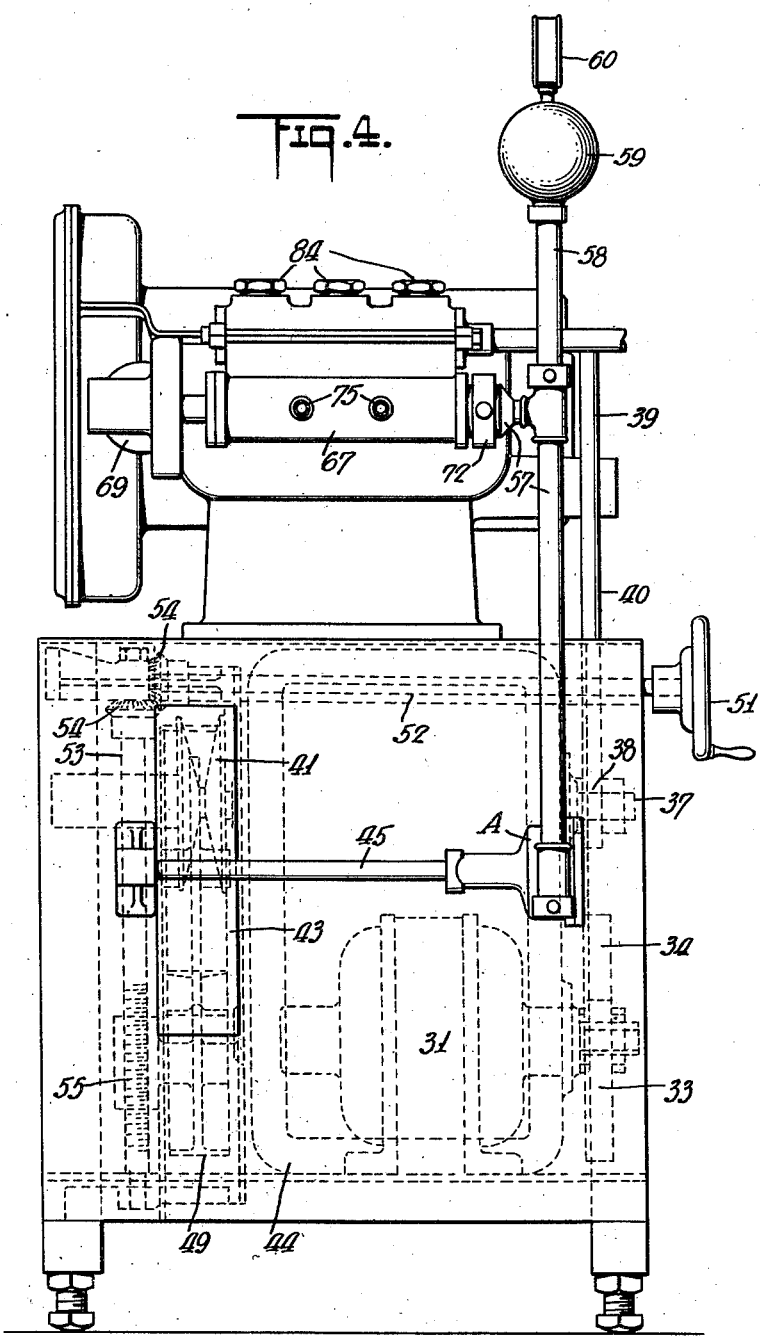
INVENTOR
Clarence W. Vogt
BY
Dean Fairbank Hirsch & Foster
ATTORNEYS Sept. 3, 1935. C. W. VOGT 2,013,016
METHOD AND APPARATUS FOR PROCESSING MATERIAL
Filed March 31, 1932 12 Sheets-Sheet 4
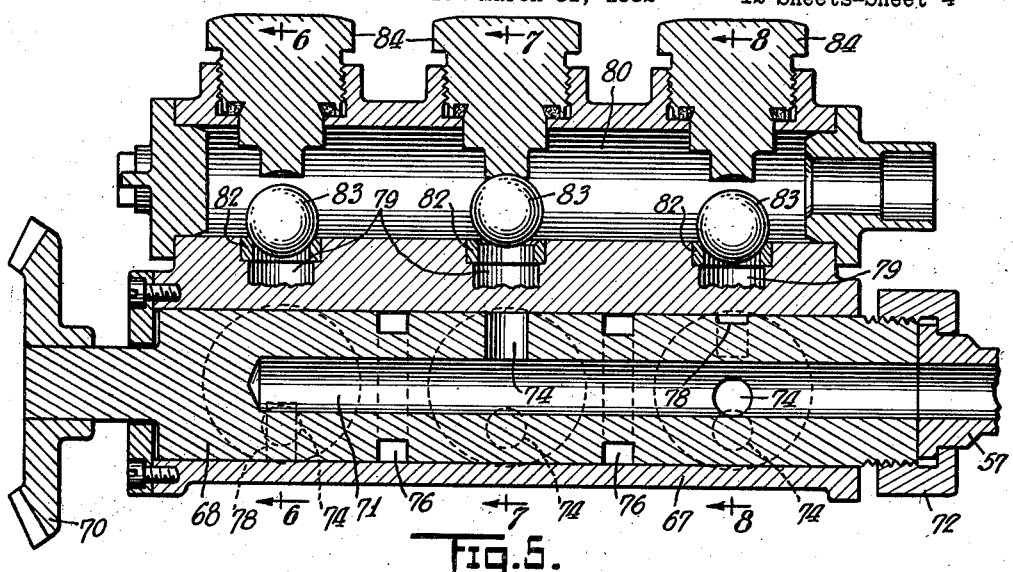
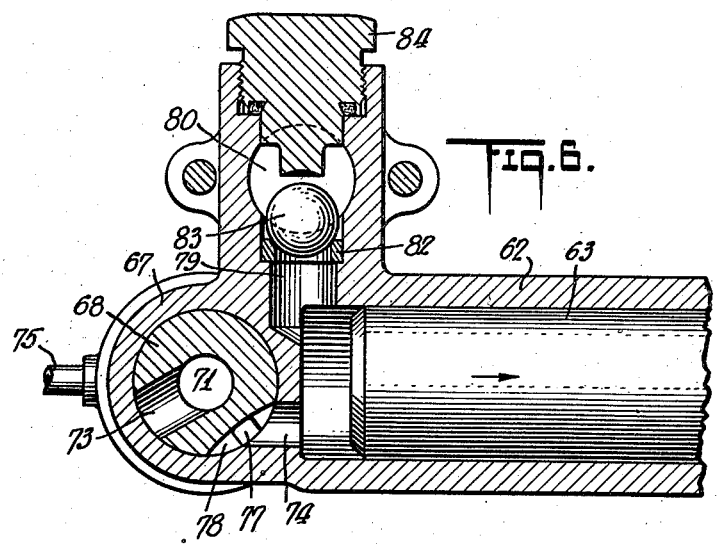
INVENTOR
Clarence W. Vogt
BY
ATTORNEYS Sept. 3, 1935.   C. W. VOGT   2,013,016
METHOD AND APPARATUS FOR PROCESSING MATERIAL
Filed March 31, 1932    12 Sheets-Sheet 5
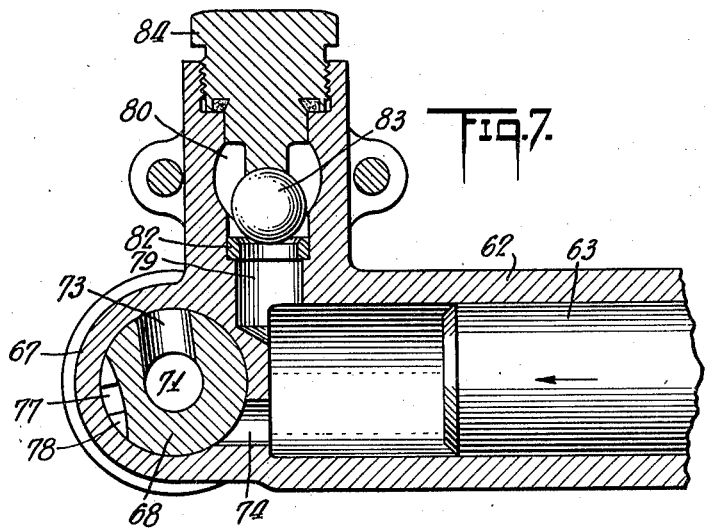
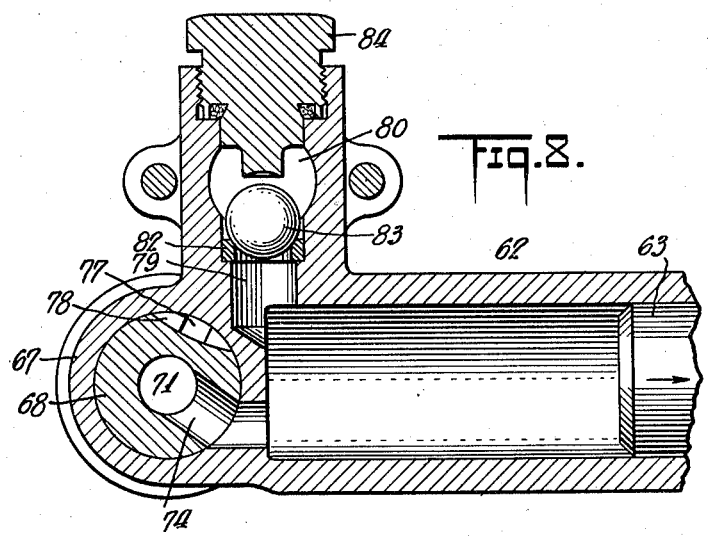
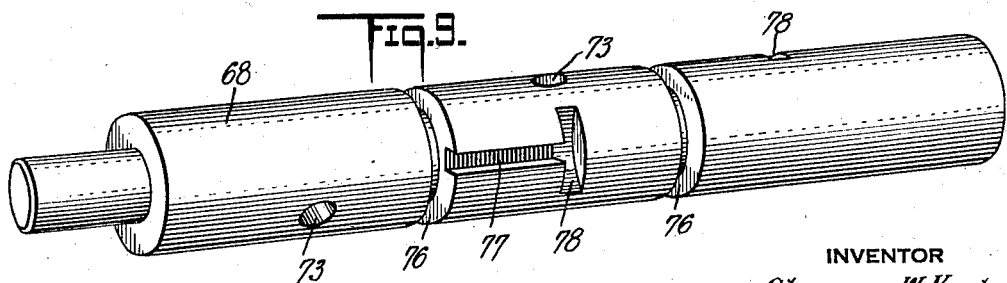
INVENTOR
*Clarence W. Vogt*
BY
ATTORNEYS

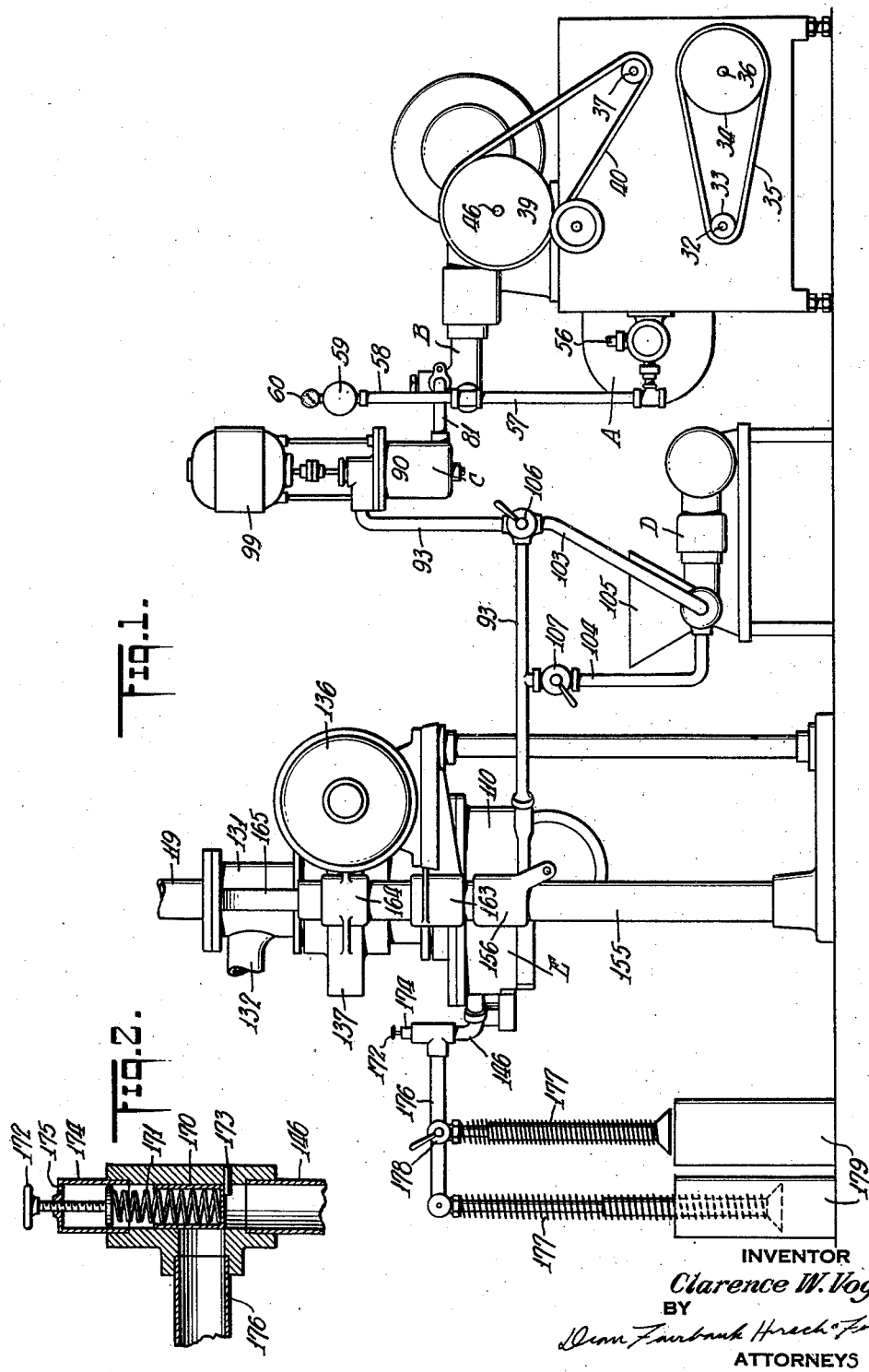

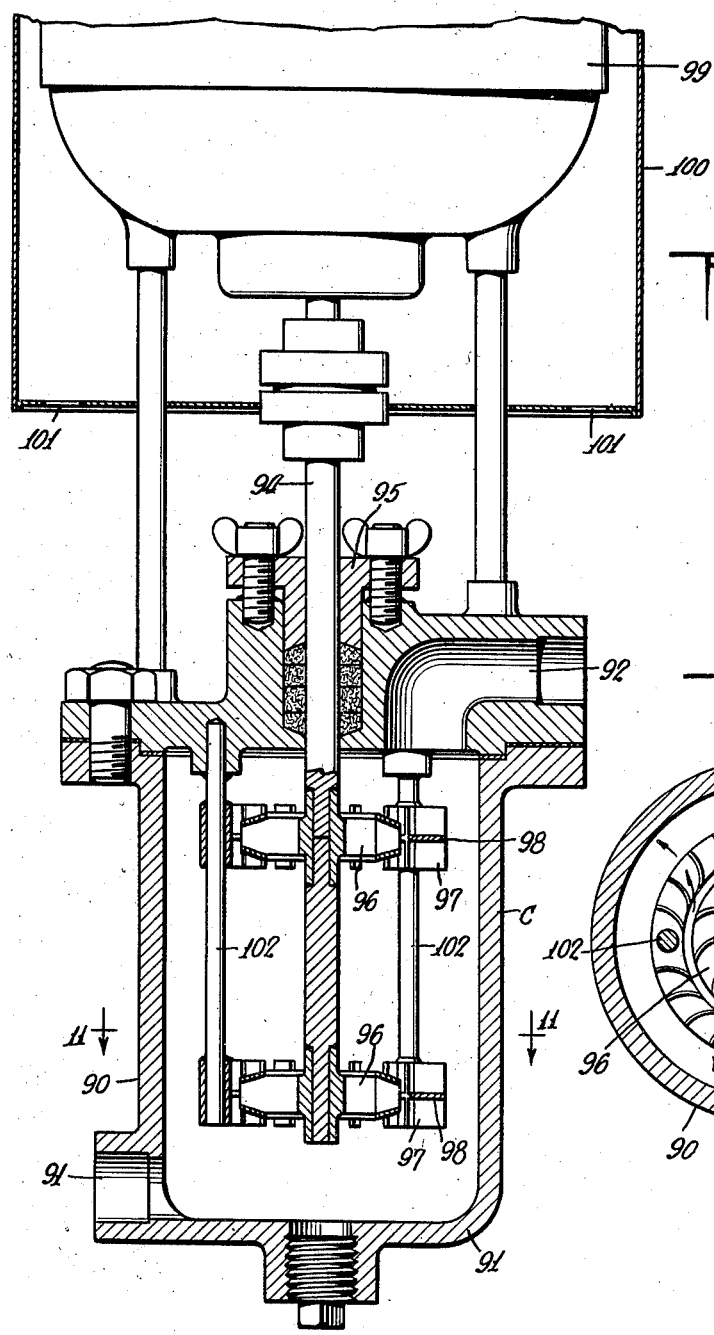
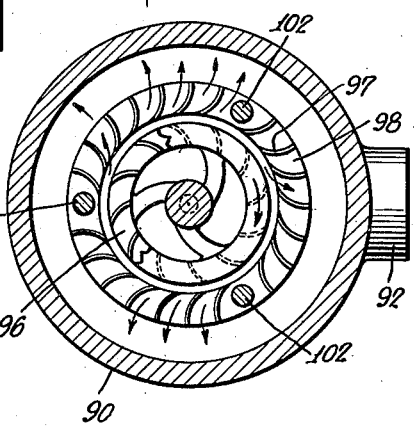

Sept. 3, 1935.  C. W. VOGT  2,013,016
METHOD AND APPARATUS FOR PROCESSING MATERIAL
Filed March 31, 1932  12 Sheets-Sheet 7

INVENTOR
Clarence W. Vogt
BY
Dean Fairbank Hirsch & Foster
ATTORNEYS

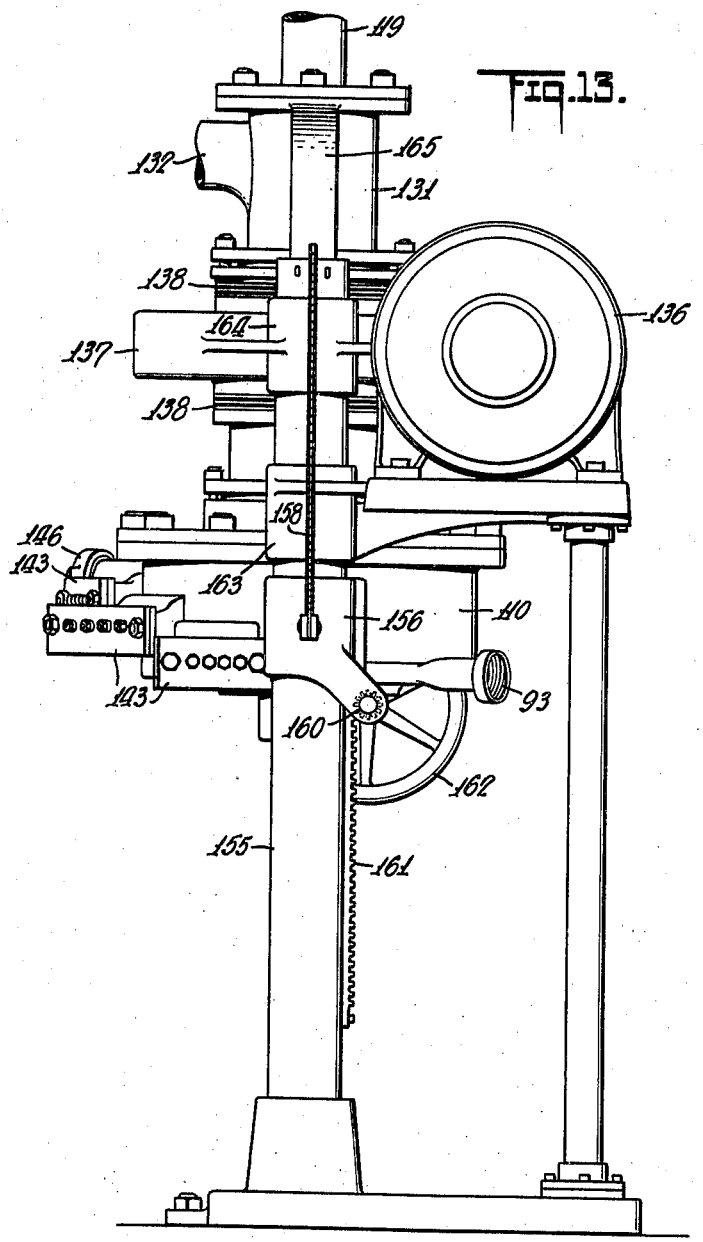

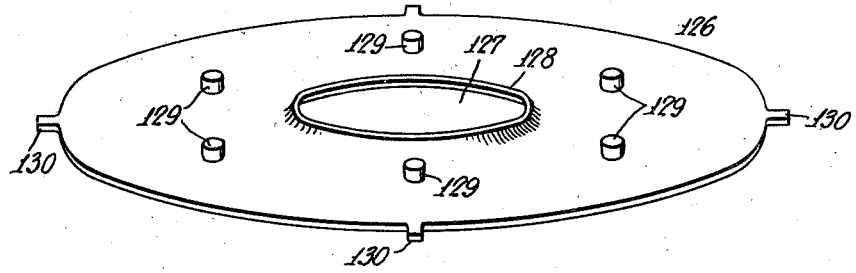
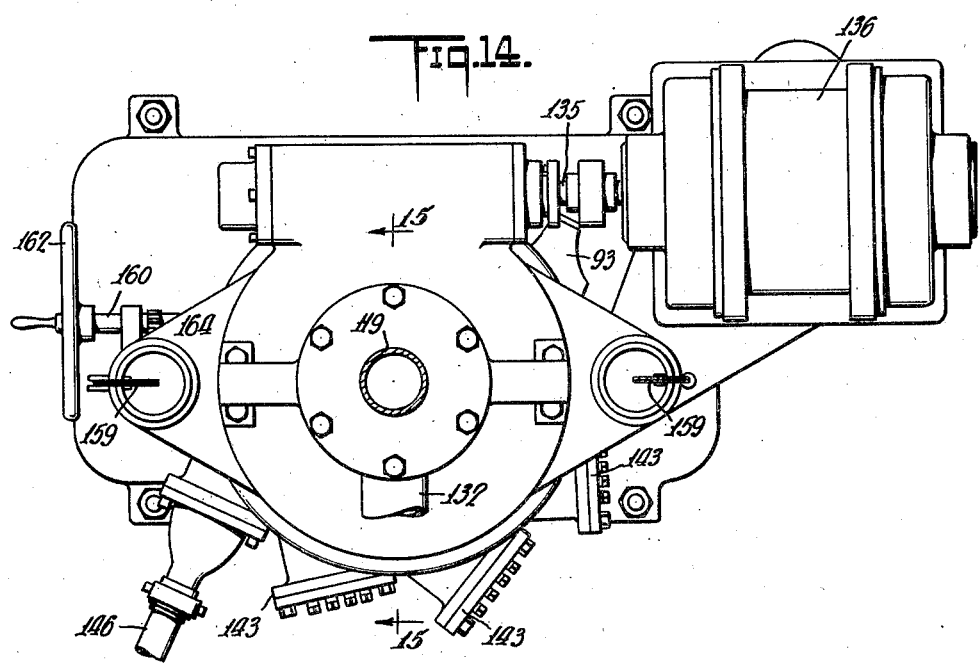
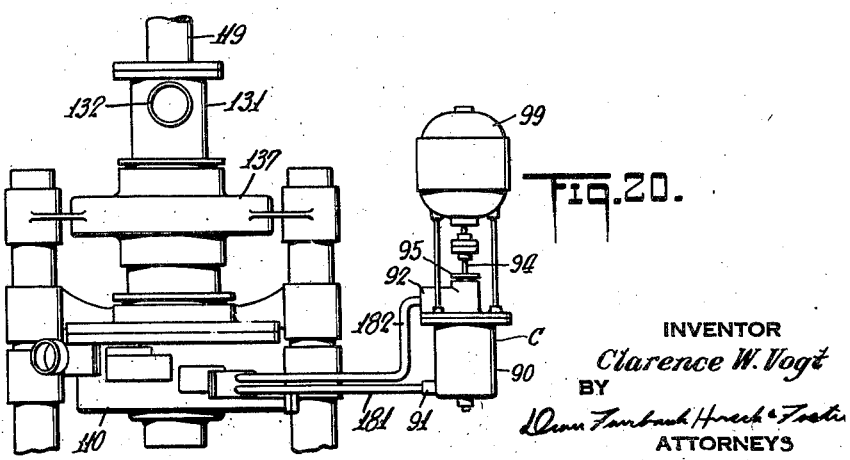

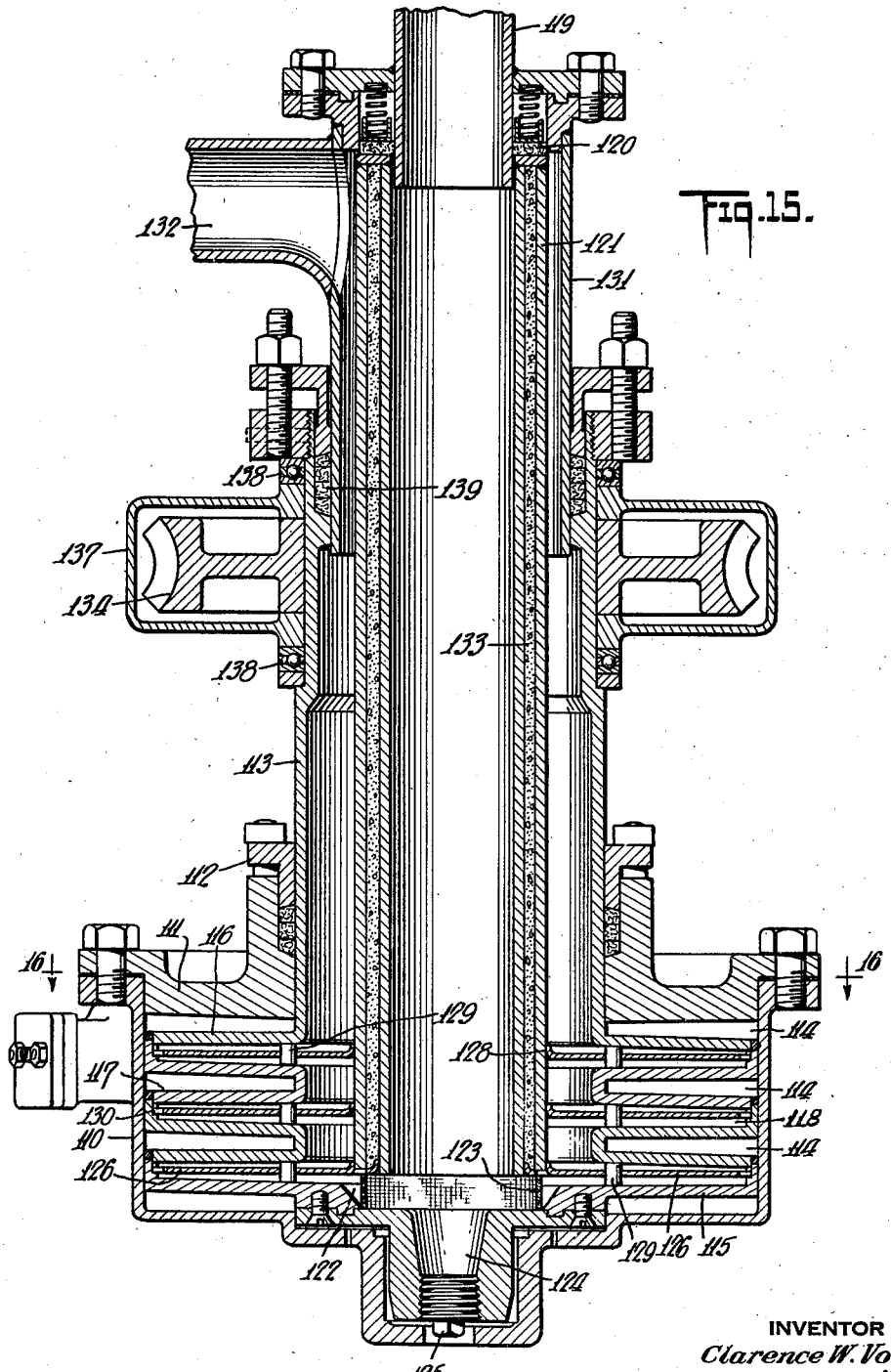

Sept. 3, 1935.  C. W. VOGT  2,013,016
METHOD AND APPARATUS FOR PROCESSING MATERIAL
Filed March 31, 1932    12 Sheets-Sheet 11
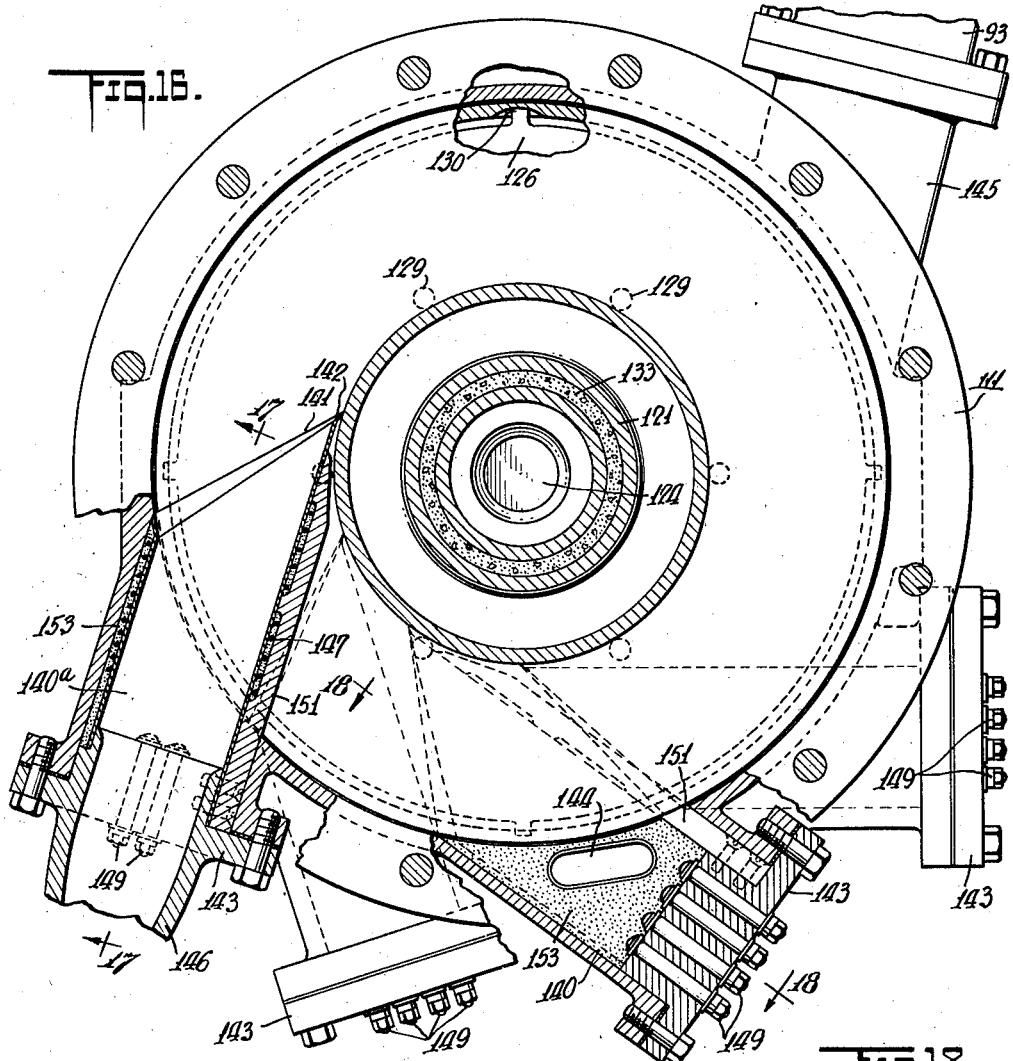
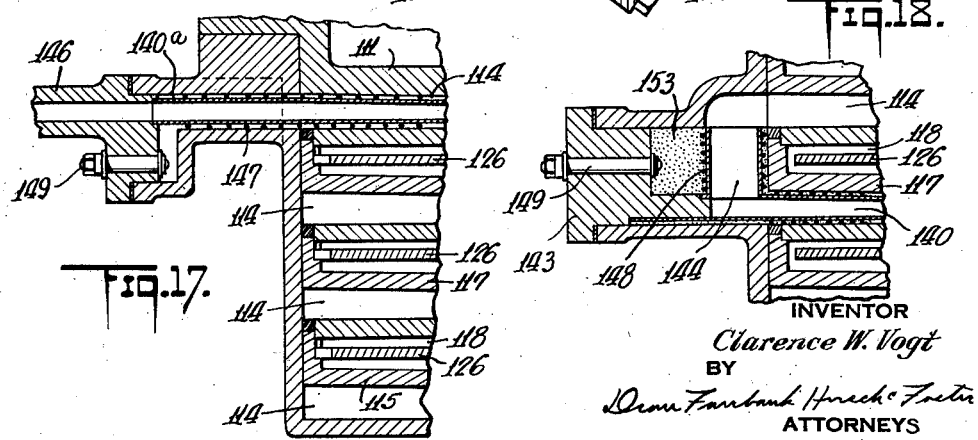
INVENTOR
*Clarence W. Vogt*
BY
ATTORNEYS

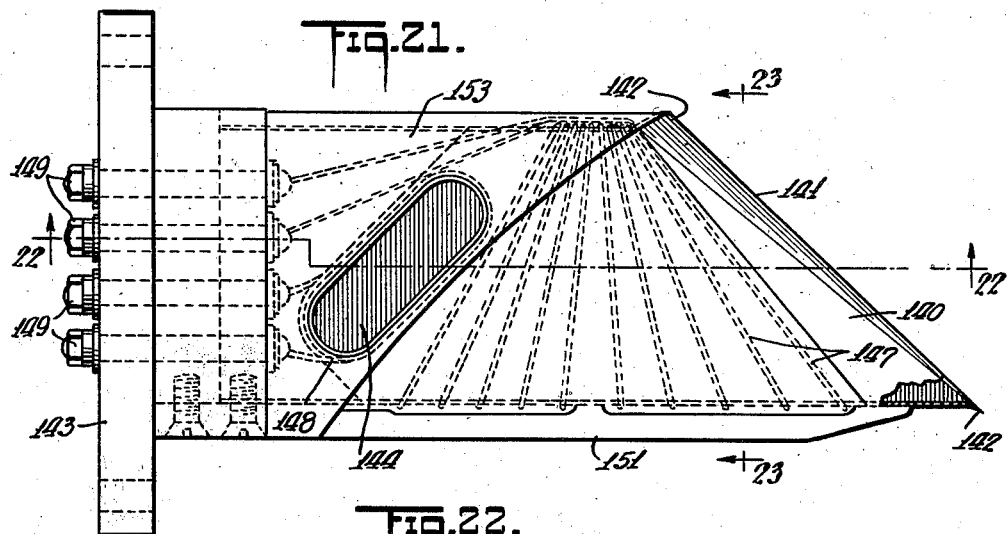
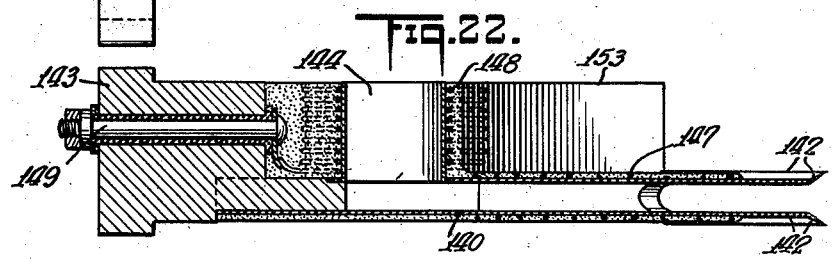
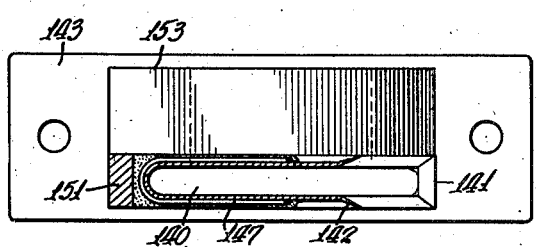
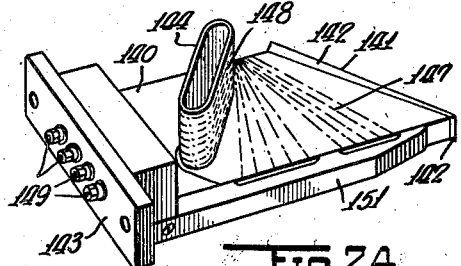
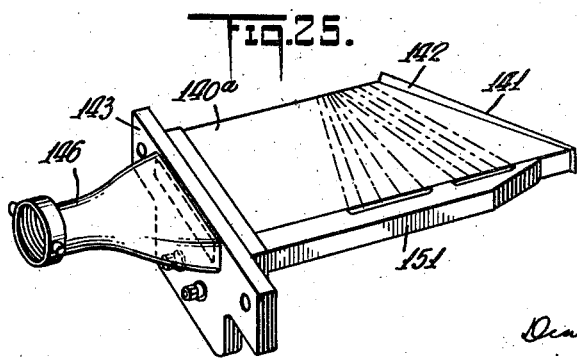

Patented Sept. 3, 1935

2,013,016

UNITED STATES PATENT OFFICE 2,013,016

METHOD AND APPARATUS FOR PROCESSING MATERIAL

Clarence W. Vogt, Louisville, Ky., assignor, by mesne assignments, to Vogt Processes, Incorporated, Louisville, Ky., a corporation of Delaware Application March 31, 1932, Serial No. 602,157

12 Claims. (Cl. 62—114)

This invention relates to methods and apparatus for processing liquid and semi-liquid materials or mixtures, wherein the heat content of the materials or mixtures is to be increased or decreased during the treatment, and while being caused to move through a confined path or cycle.

Although certain embodiments of the invention may be designed for and used with liquids or semi-liquids to be processed without the incorporation of air or other gas in the final product, one important feature of the invention relates particularly to the method and means employed for incorporating any desired relative amount of such gases.

The invention is particularly adapted for use in the freezing of ice cream, sherbet or other frozen confections which require the incorporation of air or other gas, and may be used for the freezing or chilling of fruit juices, eggs, lard or lard substitutes, margarin, and analogous products, regardless of whether or not gas is to be incorporated.

In the manufacture of ice cream, which requires the incorporation of sufficient gas to give an 80% to 120% overrun, the liquid mix employed will not retain any very considerable amount of air at atmospheric pressure, and prior to partial freezing. The usual practice with batch freezers is to only partially fill the freezer with the mix, and to rely upon the whipping and agitation, after a portion of the water content has been frozen, to fold or whip into the partial frozen material the desired amount of air. By such means the amount of air incorporated cannot be definitely regulated, and the first portion of the batch drawn from the freezer will have a different overrun from the succeeding portions.

In the type of continuous freezer disclosed in my prior Patents Nos. 1,783,864, 1,783,865, 1,783,866, and 1,783,867, issued December 2, 1930, a continuous delivery of the partially frozen ice cream with a readily controlled and uniform overrun is secured, but the gas and liquid are delivered to the freezing chamber, and unless thoroughly mixed under pressure before being admitted, incorporation of the gas in the product is accomplished by the whipping, stirring or other mechanical agitation during the freezing operation.

One of the main objects of my invention is to simplify the freezing apparatus by eliminating therefrom the mechanical whipper, stirrer or other agitator within the freezing chamber. To accomplish this object the liquid and gas are thoroughly mixed or stirred while under pressure, and prior to their admission to the freezing chamber, whereby the gas, or at least a very substantial portion thereof, is dissolved in the liquid. This liquid with the gas dissolved therein, is caused to flow into and out of contact with the temperature changing surface, whereby the freezing is effected and the desired overrun secured without mechanical whipping, stirring, beating or other mechanical agitation within the temperature changing unit.

During the freezing and upon the release of the pressure on the partially frozen material after the freezing operation is completed, at least a portion of the dissolved gas comes out of solution, and is impressed in the mass of ice crystals, butter fat, serum solids and/or other ingredients. As the pressure decreases during the progress of the material through the freezing unit, and upon the final release of pressure, the material expands to produce a smooth, palatable product with the desired and accurately controlled overrun.

The relative volumes of liquid and gas delivered to the apparatus may be controlled at will, or if desired, the liquid alone may be delivered so that the final product will be substantially free of gas. This is particularly desirable in the freezing of eggs and certain other commodities.

A further object of the invention is to provide a simple and effective means whereby relatively solid particles or bodies, such as fruit, nuts, etc., may be injected into the mixture of liquid or semi-liquid material which has previously had the gas dissolved therein. Due to the absence of beating or whipping in the freezing unit, such solid particles or bodies may thus be incorporated in the final product without being crushed or further subdivided by such beating as is usually employed in an ordinary ice cream freezer.

As a further feature of the invention the liquid or semi-liquid material with the dissolved gases, is maintained under a pressure substantially higher than that required to cause the advancement of the material, until the material has been cooled, chilled or frozen to a sufficiently stiff state so that upon release of the pressure the gas coming out of solution, due to the drop in pressure, cannot accumulate into objectionably large or noticeable cells or bubbles. The extremely fine particles or bubbles of gas coming out of solution are imprisoned and held by the stiffened material.

Although the specific freezing unit hereinafter described embodies various important features of my invention, still, so far as concerns my invention in its broader aspects, this freezing unit may be varied within comparatively wide limits, or other types of freezing units employed, preferably if adapted for the continuous passage therethrough of the liquid or semi-liquid material under pressure, and with the desired amount of gas dissolved therein.

In the accompanying drawings there is illustrated one embodiment of my invention with certain types of suitable apparatus, the details of which, except as hereinafter pointed out, may be varied within wide limits. In these drawings:

Fig. 1 is a side elevation of one combination of apparatus parts or units which may be employed.

Fig. 2 is a sectional detail of a pressure holdback control for the outlet.

Fig. 3 is an elevation, partly in section, showing the pumping mechanism.

Fig. 4 is a front elevation of the parts shown in Fig. 3.

Fig. 5 is a vertical, longitudinal section through the pump valves, said section being taken on the line 5—5 of Fig. 3.

Figure 12:
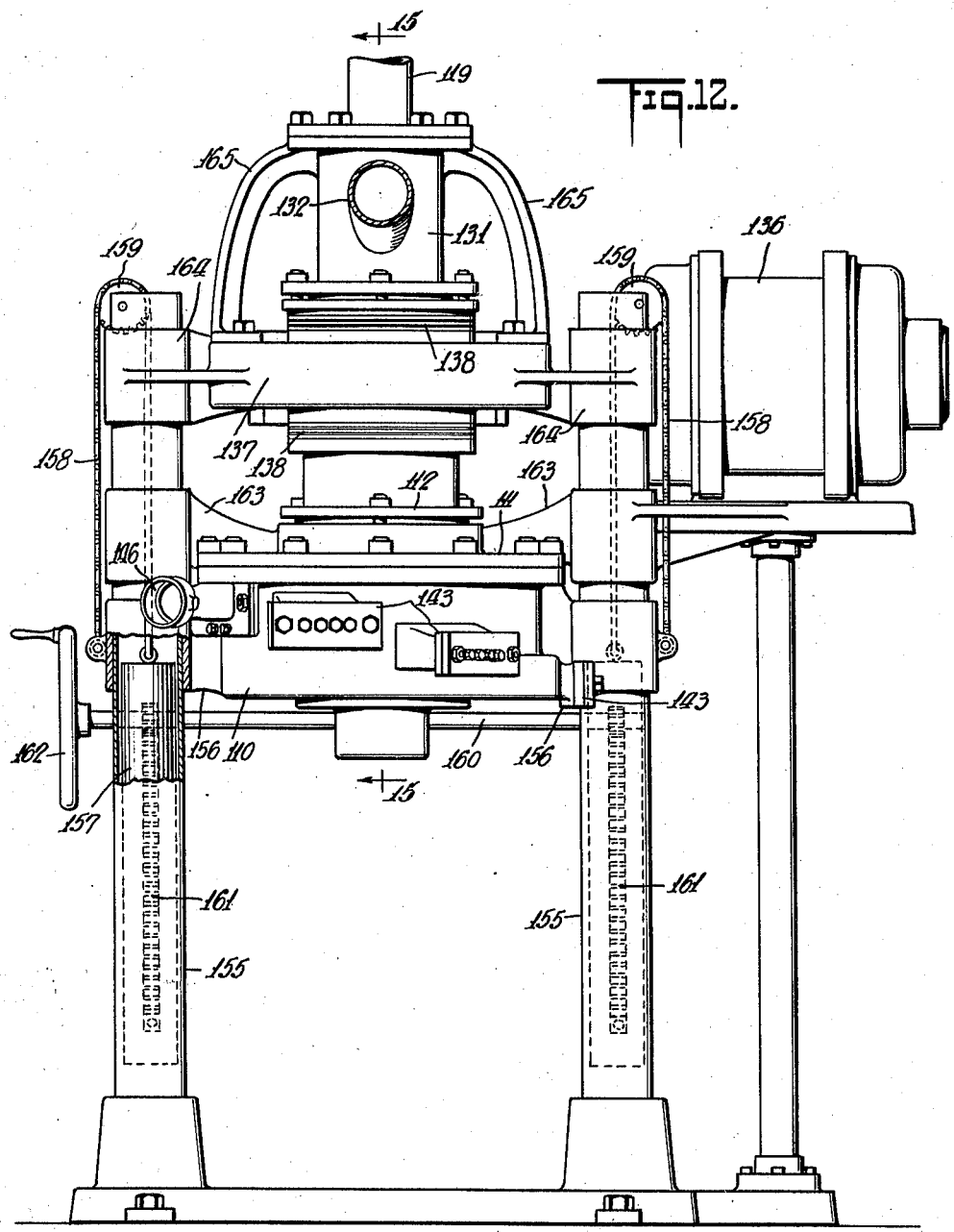

Figs. 6, 7, and 8 are transverse sections on the lines 6—6, 7—7, and 8—8 respectively of Fig. 5.

Fig. 9 is a perspective view of the suction valve for the pump.

Fig. 10 is a vertical longitudinal section through the dispersing unit.

Fig. 11 is a transverse section on the line 11—11 of Fig. 10.

Fig. 12 is a front elevation of the freezing unit.

Fig. 13 is an elevation of the freezing unit looking from the right hand side of Fig. 12.

Fig. 14 is a top plan view of the freezing unit.

Fig. 15 is a central vertical section taken on the lines 15—15 of Figs. 12 and 14.

Fig. 16 is a horizontal section taken on the line 16—16 of Fig. 15, a portion being broken away.

Figs. 17 and 18 are sectional details on the lines 17—17 and 18—18 respectively of Fig. 16.

Fig. 19 is a perspective view of one of the brine baffles.

Fig. 20 is a somewhat diagrammatic representation of an alternative arrangement in which the dispersing unit has its inlet and outlet connected intermediate of the ends of the path of flow in the freezing unit.

Fig. 21 is a top plan view of one of the transfer scoops.

Figs. 22 and 23 are sections taken on the lines 22—22 and 23—23 respectively of Fig. 21.

Fig. 24 is a perspective view of the scoop shown in Fig. 21, and

Fig. 25 is a perspective view of the upper or outlet scoop.

The main elements or units of the apparatus, as somewhat diagrammatically illustrated in Fig. 1, include a pump A for delivering the cold mix under pressure, a second pump B for receiving the mix and a gas, and delivering the two together under pressure, a dispersing unit C which receives the mix and gas under pressure and thoroughly disperses the gas throughout the mix, either in solution or fine subdivision and suspension, depending upon the pressure employed and the relative quantities of the mix and gas, a further pump D which may be employed if desired for delivering fruit, nuts or other relatively solid particles or materials to the gas charged mix, and a freezing unit E which acts to freeze the liquid or the desired portion thereof during its passage through the freezing unit, and without mechanical agitation.

The two pumps A and B, one for the mix and the other for the gas and mix, may be mounted on the same base and driven from the same source of power if desired, but with suitable means for varying and controlling their actual and relative speeds in accordance with the speed of the source of power, the effectiveness of the temperature changing medium employed in the freezing unit, the desired hardness of the delivered product, the percentage of overrun desired, the nature and type of material being treated, and other factors.

In Figs. 3 and 4 the pump A is shown as mounted upon the side of a casing 30 for the motor and gearing, and the pump B is shown as mounted on top of said casing. The pump A is preferably of the positive acting rotary type, involving the use of intermeshing gears, the pump illustrated being of a type commonly known in the trade as a Viking pump. As the details thereof form no portion of the present invention they have not been illustrated. The pump B is of the multiple plunger reciprocating type and will be described more in detail hereinafter.

The two pumps A and B are driven from a suitable source of power, such for instance as an electric motor 31. The motor shaft 32 is provided with a sprocket or pulley 33 which drives a larger sprocket wheel or pulley 34 through a chain or belt 35. The sprocket wheel or pulley 34 is on a shaft 36 and power is transmitted by means of a variable speed power transmitter of any suitable type from this shaft to a parallel shaft 37 which drives both of the pumps. For instance the shafts 36 and 37 may be provided with pairs of opposed relatively adjustable cone pulleys whereby the spreading apart of the pulleys of one pair and the pressing together of pulleys of the other pair will vary the speed ratio of the driving and driven shafts. One type of such transmission is commonly known as a Reeves drive.

I have not illustrated the details of this drive or the pulley adjusting means, but merely indicated the casing 44 thereof. The shaft 37 on one end thereof may have a sprocket wheel or pulley 38 for driving the pump B through a sprocket wheel or pulley 39 and a chain or belt 40. The same shaft, at its other end, may drive the pump A through a pulley 41, a belt and a pulley 42. The pulley 42 may be on the shaft 45 of the pump A, while the sprocket wheel or pulley 39 may be on a shaft 46 which has a pinion 47 meshing with a gear 47a on the crank shaft 48 of the pump B. Thus, both of the pumps A and B are driven from the shaft 37 and the speed of this shaft may be varied in respect to the speed of the motor 31 or other prime mover.

Means are provided for varying the relative speeds of the two pumps. For instance, the pulley 41 may comprise a pair of cone pulleys shown in dotted lines in Fig. 4, of the type used in a Reeves drive. They are adapted to be forced together by means of a compression spring, whereby upon spreading these cones apart or allowing them to come closer together, the effective driving radius is varied. To alter this effective driving radius of the pulley 41, there is provided an idler 49 engaging the belt 43 and mounted on a slide 50, which may be moved vertically to raise or lower the idler 49, thereby forcing the cone pulleys 41 apart against the compression of the spring, or allowing them to come closer together.

Any suitable means may be employed for operating this slide, but I have illustrated a hand wheel 51 on a shaft 52 and driving a vertical shaft 53 through a pair of beveled pinions 54. The lower end of the shaft 53 may be threaded into a bearing block 55 supporting the shaft of the idler 49.

The mechanism for driving the two pumps at variable speeds and for varying the relative speeds as desired, may be varied within wide limits, and therefore it will be understood that the details of the specific mechanism and the particular arrangement of the parts above described constitutes no essential part of the invention, and are illustrated merely as an example of suitable mechanism which may be employed.

The pump A receives the cold mix through a pipe 56 from mixing tanks, a homogenizer, or other suitable equipment commonly used in the manufacture of ice cream or other material to be processed, and which has not been illustrated. The mix is delivered by the pump A through the pipe 57 to the inlet of the pump B. This mix is preferably delivered under pressure and the pipe 57 may have an extension 58 with a pressure chamber 59 to compensate for the continuous delivery from the pump A and the intermittent admission of the pumped mix to the cylinders of the pump B, and may have a pressure gauge 60 to indicate the pressure.

The pump B, as previously stated, is of the multiple plunger reciprocating type, and serves to pump both gas and the mix, and deliver them under pressure. The three cylinders 62 may be cast in the same block, which may be integral with the casings for the inlet and outlet valves. Within these cylinders are the plungers or pistons 63 which slide through stuffing boxes 64 and have connected cross-heads 65 which are driven by connecting rods 66 journaled on the separate cranks of the crank shaft 48. These cranks are preferably set at angles of 120° apart to effect a more nearly uniform operation of the pump B and to distribute the load on the source of power. Although I have shown the pump provided with three cylinders and pistons, it will of course be evident that there is nothing particularly important about this number, and that any desired number may be employed.

The cylinder block may have detachably secured thereto or cast integral therewith a valve casing 67 for a rotary cylindrical suction valve 68. (See Figs. 5 to 9 inclusive). This valve is driven from the shaft 46 or the crank shaft 48 in any suitable manner, for instance by means of a shaft having a beveled gear within a gear casing 69 and meshing with a gear 70 on one end of the shaft of the valve 68.

The valve 68 has a central bore 71 registering at one end with a passage which may be the pipe 57 connected to the valve casing by a union 72, or in any suitable manner. The valve 68 has separate radial ports 73 from the bore, disposed at angles of 120° apart, and so positioned that they intermittently and successively communicate with corresponding ports 74 leading into the separate cylinders 62 and permit entrance thereto from the pipe 57.

The valve 68 also serves to control the admission of gas to each cylinder of the pump B in advance of the entrance of the mix thereto. In the manufacture of ice cream it is the usual practice to use air as the gas for giving the desired overrun, but it will be evident that any other inert gas, such for instance as carbon dioxide, nitrogen, helium or the like, may be used.

The valve casing 67 is provided with two or more ports 75 in the side thereof which may open directly to the atmosphere or may be connected by pipes to any source of other gas. The valve 68 is provided with a pair of annular grooves 76 which are in registry with the ports 74, so that the gas may enter these grooves and flow circumferentially of the valve. These grooves communicate with longitudinally extending grooves or channels 77 in the periphery of the valve, and each of these last mentioned grooves terminates in an elongated port 78 extending along a portion of the periphery of the valve, and in the same transverse plane as the radial ports 73 from the central bore 71.

Each port 78 is disposed a short distance in advance of the corresponding port 73 in the direction of rotation of the valve, so that the gas and the mix may be delivered separately and in succession to each cylinder. The relative positions of the ports and passages of the valve in respect to the drive for the pistons may be substantially as shown in Figs. 6, 7, and 8. As the piston first starts to move toward the right on the suction stroke, the port 78 comes into registry with the port 74, as shown in Fig. 6. Almost instantly after the port 78 passes beyond the port 74, and the piston has reached a predetermined position in the suction stroke, the passage 73 will come into registry with the ports 74 as shown, and during the balance of the suction stroke, no further gas will be admitted to the cylinder, but the mix will enter due in part to the movement of the piston, and in part to the pressure on the mix in the pipe 57 and bore 71, due to the action of the mix pump A. When the piston reaches the end of the suction stroke the valve 68 will have moved to such position as to close the port 74, and during the return stroke of the piston as shown in Fig. 7, the gas and mix are ejected through a port 79 under the desired pressure. It will be evident that by proportioning the width of the ports 73, 74, and 78, the relative proportions of gas and mix entering the cylinder may be varied at will. In order to produce an ice cream having 100% overrun, the gas and mix may be admitted in approximately equal quantities. This may require a slightly larger volume of gas to provide for the amount of gas which remains dissolved in the mix after the pressure is released, as will hereinafter be more fully explained. This does not mean that the passage 73 comes into registry with the port 74 when the piston is back one-half of its stroke. The gas being sucked in may enter at slightly below atmospheric pressure, whereas the mix is forced in and may act to very considerably compress the air in the cylinder even before the piston reaches the end of its intake or suction stroke. Furthermore, the gas may be delivered to the inlets 75 under pressure, and if so, the position and/or size of the ports 73 and 78 may be correspondingly varied.

The several cylinders communicate with a discharging passage 80 which is connected at one end to a delivery pipe 81. The passage 80 may be formed directly in the cylinder block or cylinder head, and communicates with the several cylinders through the discharge ports 79. Each of these ports may have a valve seat 82 engaged by a ball check valve 83, and the upper side of the valve casing may have removable blocks or caps 84 whereby the valves and valve seats may be removed, and whereby the limit of movement of the ball valves away from their respective seats may be controlled. During the discharge stroke of each piston the gas will tend to flow out first as the discharge ports 79 are on the upper side of the cylinder. The mix will be discharged last, and therefore a liquid seal will be left around the ball valve. The intake ports 74 of the cylinder are preferably closely adjacent to the lower sides of the cylinders so that these ports will remain filled with liquid during the discharge stroke and aid in sealing the rotary valve 68; also this positioning of the intake ports prevents any trapping of air in the ports and also serves to avoid any undue turbulence or mixing of the gas and liquid in the cylinder. To prevent the intermixing (and foaming) of the mix within the pump cylinders, the pump is preferably geared down to operate slowly.

As an important feature of my invention the gas and liquid after being delivered from the pump are thoroughly intermixed under pressure, and the pressure is preferably sufficiently high and the mixing sufficiently thorough so as to uniformly disperse the gas throughout the liquid, and either in actual solution or in a very uniform emulsion of very minute gas bubbles. The particular mechanism employed for effecting this thorough and uniform dispersion of the gas in the mix may vary within wide limits.

In the particular type shown the dispersing unit C includes a casing 90 having an inlet 91 at the bottom connected to the pipe 81, and an outlet 92 at the top connected to a delivery pipe 93. A shaft 94 projects through a stuffing box 95 in the top of the casing, and is provided within the casing with a pair of wheels, mixers, or rotors 96 having curved vanes and blades analogous to those of certain types of centrifugal pumps or turbines. Encircling each wheel is an annular guide member 97 having blades spaced to form passage curved in a reverse direction from the curvature of the passages in the wheel 96, so that the material thrown out centrifugally by the wheel or rotor will be guided substantially radially and prevented from bodily swirling around within the casing in the direction of rotation of the wheel 96. The annular guide member 97 preferably has a substantially annular horizontal partition 98 in substantially the plane of the center of the wheel so that a portion of the material thrown out by the wheel will be guided downwardly and a part upwardly as it approaches the peripheral wall of the casing. The shaft 94 is driven at high speed in any suitable manner, as for instance by a motor 99 which may be supported at the top of the casing 90, and preferably within a protected casing 100 shown in Fig. 10, but omitted from Fig. 1. This protected casing 100 may serve to protect the motor during washing of the apparatus, and may have openings 101 for the circulation of air to prevent overheating of the motor.

One of the rotors 96 is near the upper part of the chamber, and the other near the lower part, so that the material thrown out by each may return to the intakes of the rotors both above and below each rotor. The capacity of each rotor 96 is preferably greater than the capacity of the pump B, so that the gas and liquid are circulated many times within the dispersing unit before passing to the outlet 92. The annular guides 97 may be supported around the wheel 96 in any suitable manner, for instance by rods 102 depending from the top wall or cover of the casing.

Although the motor is shown above the casing 90, this is not essential and to bring the mass as low as practical it is preferably below the casing, and with the shaft extending up through a stuffing box in the bottom.

The mix under pressure, and with the desired volume of gas thoroughly dispersed and dissolved therein, may be delivered directly to the freezing unit E, or may be delivered through a pumping mechanism for forcing fruit, nuts or the like into the mix before it reaches the freezing unit.

In Fig. 1 I have illustrated somewhat diagrammatically a pump D which may receive a very small portion of the mix from the pipe 93 through a three-way valve 106 and a branch pipe 103, and return it through a pipe 104 having a shut-off valve 107. The fruit, nuts or the like, may be applied to a hopper 105, and only enough mix is admitted by the valve 106 and pipe 103 to serve as a lubricant for the solids and permit their easy flow through the pipe 104 into the pipe 93 against the high pressure therein, which may be 200 pounds to the square inch, if that pressure be required to hold in solution the volume of air used. The slight opening of the valve 106 causes a drop in pressure on the mix delivered to the pump D, without causing any substantial pressure drop in the pipe 93.

The freezing unit involves an important feature of my improved apparatus, and serves to freeze the aerated mix to the desired hardness, and under the desired pressure, without concurrent mechanical agitation. This freezing unit is shown particularly in Figs. 12 to 25 inclusive.

As an important feature of this freezing unit there is provided a rotor having a plurality of annular grooves, one or both side walls of which are refrigerated. The material to be frozen is delivered to one of these grooves and after having been carried around through nearly one revolution is deflected through a passage into the next groove, where it is again carried around through nearly one revolution. There may be as many of these grooves as desired, depending upon the extent of freezing desired, the temperature of the refrigerant, the nature of the material being treated, and other such factors. The material does not flow circumferentially in respect to the rotor, or at least flow to any considerable degree, but is bodily carried along by the walls of the grooves. There is no mechanical agitation of the material while passing through the freezing unit, nor any further intermixing or dispersion of the gas in the liquid. The material is retained under pressure in the grooves by a peripheral casing, and if necessary, by a hold-back valve at the outlet, although the material itself may be frozen sufficiently stiff in the last groove to offer such resistance to flow as will permit the maintenance of the pressure in the first grooves, and prevent any separation of the gas from the mix prior to the freezing of the latter. As the mix freezes, the major portion of the gas in solution may separate in the form of very minute bubbles between the ice crystals or particles of solid separated from the solution by the reduction in temperature, but such bubbles will remain thoroughly dispersed throughout the mass. The mass as it leaves the freezing unit and has had its pressure materially reduced, for instance to approximately that of the atmosphere, will or may expand to a considerable extent and form a light and palatable product with as high an overrun as desired, and depending upon the accurately determined and controlled relative proportions of gas and mix pumped into the dispersing unit.

The specific form of freezing unit illustrated particularly in Fig. 15 includes a casing 110 through which the material to be frozen is caused to move. The casing may have the bottom thereof formed integral with the peripheral wall, and have the latter detachably bolted to a top wall 111. The top wall includes a stuffing box 112 through which extends the hollow shaft or tubular member 113 of the rotor. The rotor is provided with a series of peripheral grooves 114 separated from each other by the peripheral wall of the casing 110, in which it is mounted. The rotor may be formed of a bottom wall 115, a flange 116 on the hollow shaft 113, and a series of annular members 117, each with a U-shaped annular groove 114. These members have their peripheral edges welded together in series and to the bottom wall 115 and the flange 116, to form a rigid structure. The grooves 114 face outwardly in a radial direction, while between these grooves there are formed annular grooves 118 facing inwardly in a radial direction. The refrigerant is caused to circulate in the internal grooves 118 so that there is an effective heat transfer through the walls of the grooves, and so that the material to be frozen is exposed in comparatively thin annular layers. The refrigerant is delivered through a supply conduit 119 which extends through a stuffing box 120 into the upper end of a vertical centrally disposed conduit 121. This conduit is connected to the rotor by means of a lower baffle 126, hereinafter referred to, so as to be rotatable with the rotor. At the lower end there is a series of ports or an annular port 122 above the bottom wall 115. To prevent any solid impurities in the refrigerant from passing out into the refrigerant grooves 118, there is preferably provided an annular screen 123 covering the port 122, and below this screen is a trap 124 for the collection of sediment or solid particles. The trap may be opened at the bottom for cleaning by the removal of a closure plug 125.

Within each of the refrigerant grooves 118 there is an annular partition plate or baffle 126, to cause the refrigerant to circulate out radially along the bottom of the groove and back inwardly into the annular passage leading between the shafts 113 and 121 to the next successive groove. One of these partition plates is shown in perspective in Fig. 19. It includes an annular plate 126 with the central opening 127 thereof encircled by a flange 128 welded to the periphery of the conduit 121 to form a seal. Each annular plate or baffle may have an annular row of studs 129 for spacing the plate midway between the upper and lower sides of the refrigerant groove, and at the periphery may have radially extending projections 130 which may engage with shoulders or in recesses in the outer periphery 118, as shown in Fig. 16. These projections are spaced apart to leave free passages for the flow of the refrigerant from the under side to the upper side of the baffle.

The upper part of the conduit 121 is enclosed in an upper casing 131 having a refrigerant outlet 132. As the fresh incoming refrigerant within the conduit 121 is colder than the outgoing refrigerant flowing along the outside of said conduit, this conduit is preferably insulated to prevent heat transfer therethrough. As shown, the conduit 121 is formed of two separate concentric metal pipes with insulation 133 therebetween.

Any suitable means may be provided for rotating the rotor at the desired speed. It is desirable that this speed be readily adjustable to permit variations in the capacity of the freezer. This can be accomplished by a variable speed motor, a Reeves variable speed transmission, or a Waterbury hydraulic gear. As shown, the tubular outlet shaft or conduit 113 is provided with a worm wheel 134 which meshes with the worm on the shaft 135 of a variable speed electric motor 136. The gearing is enclosed within a casing 137 encircling the rotor shaft part 113, and provided with ball bearings 138 at its upper and lower sides. The upper shaft section 131 extends through a stuffing box 139 into the upper end of the rotatable member 113.

In the construction illustrated, the refrigerant enters the pipe 119, flows downwardly through the pipe 121 and through the screen 123 and port 122, into the annular space beneath the lower baffle 126. It thence flows outward radially beneath this plate, around the outer edge, and back to the inner edge of the plate, from which it flows upwardly to the next plate and through the several refrigerant grooves in succession. The refrigerant then flows upwardly through the annular space between the conduit 121 and the tubular member 113 to the casing 131 and outlet 132. I may employ any suitable refrigerant, depending upon the desired rate of flow of the refrigerant, and the material to be treated, and upon the temperature to which the material is to be subjected. The construction illustrated is adapted for the use either of brine or a volatile refrigerant, such as ammonia. If ammonia be employed, the inner conduit may be supplied with liquid ammonia, as is common in ammonia circulating systems in which the liquid is delivered to the lowermost point where evaporation is to take place, and the resulting gas and unevaporated liquid flow in a general upward direction in heat interchanging relationship to the material to be chilled or frozen.

In some cases it is preferable to effect countercurrent flow of the refrigerant and the material, but in the form shown the connections are for flow in parallel.

The material delivered through the conduit 93 enters the lowermost groove between the bottom wall 115 of the rotor and the bottom wall of the casing, where it is subjected to refrigeration from one side only, or may enter directly to the first of the grooves 114 in the rotor itself, where it is subjected to refrigeration along both the upper and lower surfaces. Means are provided for transferring the material from each groove to the next higher one, and eventually to an outlet which may be from the upper member 117, or from the annular groove between the flange 116 and the top wall 111 of the casing. A preferred embodiment of this transfer means is shown particularly in Figs. 16 to 18 and 21 to 25.

This transfer means illustrated includes a plurality of scoops 140, each extending through the peripheral wall of the casing in a substantially tangential direction into a separate groove 114, and having one wall terminating closely adjacent to and tangential with the inner periphery of said groove. The scoops are in the form of tubular members with their inner ends 141 disposed diagonally, and with their edges 142 flared and beveled, so as to lie closely adjacent to the walls forming the grooves 114. Thus the body portion of each scoop is slightly spaced from the walls of the grooves to prevent friction. These tubular members are connected to detachable closure members 143 at their outer ends so that they may be readily pulled out endwise for cleaning or other purposes.

Each closure member except the uppermost or discharge member, has a passage 144 leading vertically from the tubular scoop member 140 to the next higher groove 114. Opposite to the lowermost groove the casing has an extension 145 which may be detachably secured to the supply conduit 93, while the uppermost scoop 140a (Fig. 25) is open at its outer end and is detachably secured to a delivery conduit 146.

The several scoops and the inlet from the conduit 93 are so disposed in respect to each other that the material entering each groove travels around with the rotor for approximately 330° before reaching the scoop which transfers the material to the next successive groove. This will be apparent from Fig. 16. The rotor is turned in a counterclockwise direction, and the material entering through the conduit 93 travels around in the lowermost groove until it reaches the scoop which is shown as extending transversely of Fig. 16, and toward the right hand side. This scoop transfers the material to the next groove, in which it travels around to the next successive scoop, which is shown as extending downwardly and toward the right in Fig. 16. The material travels around to the next scoop, and thence to the upper groove, where it travels around until it reaches the upper or outlet scoop 140a, which leads to the delivery conduit, as shown at the lower left hand side of Fig. 16. The scoops operate to positively remove the material from the inner, upper and lower sides of each groove, but the material is caused to flow through each scoop and the passage 144 by the pressure on the material, due to the initial pressure of the supply pumps and the advancing force exerted by the removal of the material from the walls of the grooves during the turning of the rotor.

In order to prevent the material from freezing to the inner surfaces of the scoops 140, and to facilitate the flow through these scoops and the passages 144 thereof, I preferably provide electrically heated units in connection with each scoop tube. This may include jacketed coils of nickel chromium wire, such as is usually used in heating elements, although in the Figs. 21 to 25 inclusive, the type of element shown is preferably enamel coated nichrome wire, the enamel being for electrical insulation and at the same time permitting sufficient heat to pass through the wire to furnish the necessary reactance to the refrigerating effect of the annular members 117 of the rotor. In applying these wires they are embedded in an enamel coating.

The scoops as shown in Figs. 21, 22, 23, and 24, are provided with two heating coils, one of these coils, 147, being formed around the elongated tubular portion of the scope 140, and the other coil, 148, being formed around the vertical port or passage 144. The lead wires for carrying the electric current to and from these electrical heating coils are connected through insulated connector bars or terminals 149 which pass through ports in the closure 143. The usual flexible, insulated conductors connect these terminal ports with any suitable source of current. In order to compensate for variations of the refrigerating effect under day to day operation, I interpose rheostats in these electric heating circuits, but illustration thereof seems to be unnecessary. Scoop 140a (Fig. 25) is the upper or outlet scoop, and differs from scoops 140 principally in that it is provided with only one heating coil and does not have the vertical port or passage 144, but instead, is provided with an outlet port or conduit 146. It is not always essential to equip the scoops with heating elements as, in the processing of some materials, the transfer or advancement between grooves can be accomplished without their use. However, to advance relatively stiff and plastic materials, such as is represented by the usual ice cream mix after it has reached the semi-frozen state, less force is required by slight heating and greater uniformity of pressure may be maintained on long runs. These heating elements are intended primarily to prevent freezing of the material rather than any actual heating or melting of it, although they may serve to slightly soften the surface layer of the material passing through scoops to facilitate its sliding movement through the scoop tubes and passages 144.

The form of scoop which I have shown in Figs. 21 to 25 inclusive is provided with a backing bar 151 which serves as a backbone or stiffener for the scoop. I also prefer to fit this backing bar 151 to conform closely to the contour of the groove 114 in which it is mounted.

In order to prevent the material which is being treated from being pocketed into the irregular-shaped spaces between the closure 143 and the ports 144, there is provided a filler block 153 which may be of rubber or phenolic resin base, pressed into the interstitial spaces formed by the relative juxtaposition of these aforementioned parts. This filler block is not shown in Fig. 24, it being omitted to more clearly show the other part.

My improved apparatus is so designed that it may be very readily taken apart for cleaning and sterilizing. The several scoop tubes may be unbolted and pulled out endwise, and the supply and delivery conduits disconnected. The top wall 111 of the casing is supported by the frame of the machine, but the body of the casing may be moved downwardly upon unbolting it from the top wall 111. When in lowered position the outwardly facing grooves of the rotor are exposed so that the entire surface of the rotor which comes in contact with the material may be readily cleaned.

As in the manufacture of ice cream and other comestibles it is necessary to clean and sterilize the apparatus between successive periods of operation, it is desirable that means be employed to facilitate the lowering and replacement of the casing 110. In the construction illustrated, the freezing unit is supported upon a frame including pedestals or standards 155. The casing 110 is provided with brackets 156 which are vertically slidable upon these standards and guided thereby during the raising and lowering of the casing. The pedestals are shown as being hollow with counter weights 157 therein connected to the brackets 156 by chains 158 extending over sprocket wheels 159 at the upper ends of the standards. The brackets 156 may provide bearings for a shaft 160 having pinions meshing with rack bars 161 on the sides of the standards. The shaft may be provided with a hand wheel 162, whereby the shaft 160 may be rotated to cause the pinions to travel up or down the rack bars, and thereby raise or lower the casing 110.

From Figs. 1, 12, and 13 it will be seen that the top wall 111 of the casing is provided with brackets 163 secured to the pedestals 155 so that this top wall remains stationary during the raising and lowering of the body of the casing. The casing 137 around the worm wheel 134 is likewise provided with brackets 164, secured to the standards to hold this casing against vertical movement. The top of the casing 137 may be provided with brackets 165 for engaging the casing section 131 and preventing rotation thereof with the rotor of the unit.

Upon starting the apparatus in operation it is desirable to maintain a back pressure on the material passing through the freezing unit, and this back pressure may be continued if desired during the normal operation. Merely as one means for maintaining such back pressure I have shown a valve mechanism in Fig. 2 which includes a piston or plunger 170 pressed toward closing position by a spring 171, the pressure of which may be varied by an adjusting screw 172. A stop 173 may be provided to control the extent to which the plunger may be moved by the action of the spring. This spring pressure may be readily adjusted so as to give any desired back pressure on the material. The adjusting screw is preferably mounted in a casing 174 which may have an outlet port 175 to permit flow of air into or out of the casing during movement of the plunger 170.

The material delivered past the back pressure valve shown in Fig. 2 may be conducted by a pipe 176 to any suitable receiving mechanism. Merely as an example I have shown a pair of filling tubes 177 to either of which the material may be delivered by a three-way valve 178, and which filling tubes are formed of telescopic sections and extend into receptacles 179 so that the material is delivered to the bottom of each receptacle and the discharge end of the tube rises as the receptacle fills. This construction forms no portion of the present invention but is more specifically disclosed and claimed in the Clarence W. Vogt and G. O. Wymond Patent No. 1,881,106, issued October 4, 1932.

In the specific unit above described the material is delivered to the several refrigerating grooves in succession, and the gas is incorporated before the mix reaches the refrigerating unit. In some cases it may be desirable to use a portion of the freezing unit to chill or partially freeze the material and thereafter thoroughly disperse the gas therein before further freezing the material in the balance of the refrigerating unit.

In Fig. 20 I have shown a construction in which the material after passing through the lowermost groove of the refrigerating unit is withdrawn through a pipe 181 to the dispersing unit C, and then returned through a pipe 182 for passage through the remaining grooves. In some cases a very much larger number of grooves may be provided in the freezing unit and the same unit used for freezing two or more different mixes independently of each other. For instance, the separate refrigerating grooves or separate groups of grooves may be connected to separate supply pumps and delivered to separate containers. Thus, certain of the grooves may be used for freezing a vanilla mix and other grooves for freezing strawberry or other flavor. Different materials may be frozen to different degrees of hardness by controlling the number of grooves through which the material is caused to pass. The discharge scoop 140a may be inserted in place of any of the other scoops so as to deliver the material from the unit after passing through one, two or any desired number of grooves.

As previously noted, the freezing unit may serve for effecting temperature changes without actual freezing of the material, or may be used for heating the material by delivering a heating medium rather than a cooling medium through the conduit 119.

The process hereinbefore described insofar as it does not require the aerated mix to freeze in a quiescent state is disclosed and claimed in my application Serial No. 1314, filed January 11, 1935, which is a continuation in part of this application.

The pumping mechanism hereinbefore described and illustrated in Figs. 3 to 9 inclusive is disclosed and claimed in my divisional application Serial No. 459, filed January 5, 1935.

In the present application the claims are directed to the primary freezer involving quiescent freezing, one embodiment of such freezer being shown in Figs. 12 to 25. In the present application there is also claimed the method and apparatus involving such quiescent freezing.

Having thus described my invention, what I claim as new and desire to secure by Letters Patent is:

1. A method of processing a liquid or semi-liquid material, including the steps of continuously advancing the material and a gas into, through and out of a high pressure stage, agitating the material during the movement through a portion of said high pressure stage, but without substantial change in temperature of the material, and subjecting the material and gas to the action of a temperature changing medium while passing through a further portion of said high pressure stage in a substantially quiescent state.

2. An apparatus for processing material, including means for agitating the material and a gas under pressure to effect at least partial solution of the gas in said material, a unit having a passage therethrough for the continuous flow of the material and dissolved gas in a substantially quiescent state, and means for applying a temperature changing medium to said material during its flow through said passage.

3. An apparatus for the processing of material, including a chamber having a rotor therein provided with a plurality of separate annular grooves, means for delivering material under pressure to one of said grooves, means for transferring the material from each groove to the next succeeding one, means for delivering material from the last groove, and means for subjecting the material to the action of a temperature changing medium while in said grooves.

4. An apparatus for processing material, including a casing, a rotor therein and having an annular groove in the periphery thereof, the casing being juxtaposed to the periphery of the rotor to retain material in the groove, said casing having an inlet at one point to said groove and an outlet at another point from said groove, means for delivering material under pressure to said inlet, and means for subjecting the material to the action of a temperature changing medium while in said groove.

5. An apparatus for processing material, including a casing, a rotor therein and having an annular groove in the periphery thereof, the casing being juxtaposed to the periphery of the rotor to retain material in the groove, said casing having an inlet at one point to said groove, and a scraper projecting into said groove for removing material therefrom at another point, means for interiorly refrigerating said rotor, and means for delivering material to said inlet under pressure.

6. An apparatus for freezing ice cream or the like, including a casing, a rotor therein and provided with a plurality of annular grooves in the periphery thereof, direct communication between said grooves being prevented by said casing, means for internally refrigerating said rotor, means for delivering a liquid under pressure to one of said grooves, a scraper projecting into said groove for removing material therefrom during the rotation of the rotor, means for conducting material from one of said scrapers, and means for transferring material from each of the other scrapers to the next succeeding groove.

7. An apparatus for processing material, including a casing, a rotor having a corrugated peripheral wall juxtaposed to said casing to form a plurality of separate annular passages upon the outside of the rotor, and a series of annular passages on the interior of the rotor, means for applying a temperature changing medium to the last mentioned passages in succession, and means for delivering material to said first mentioned passages in succession.

8. An apparatus for freezing ice cream or the like, including a casing having an inlet and an outlet, means for delivering the material to be frozen to said inlet, a rotor within said casing having a series of annular grooves, one of which is juxtaposed to said inlet, means for applying refrigerant to the interior of said rotor, and means carried by said casing for transferring material from each groove to the next successive one during the rotation of said rotor.

9. An apparatus for freezing ice cream or the like, including a casing, a hollow rotor disposed in said casing and having peripheral grooves closed at their outer sides by said casing, means for circulating a refrigerant through said rotor, means for delivering material into each of said grooves under pressure, means for rotating said rotor, and scoops carried by said casing and projecting into said grooves for removing material therefrom during said rotation.

10. An apparatus for freezing a liquid or semi-liquid material, including a rotor having a peripheral wall presenting alternate inwardly and outwardly facing annular grooves, a casing enclosing said rotor and juxtaposed to said peripheral wall to close the outer sides of the outwardly facing grooves, means for circulating a refrigerant through said rotor and into and out of the several inwardly facing grooves, means for delivering the material under pressure to one of said grooves, a series of scoops carried by said casing and extending into said grooves to receive the material and remove it from the grooves during the rotation of the rotor, passages connecting each of the scoops except the last in the series to the next succeeding groove, an outlet connected to the scoop of the last groove of the series, and pressure releasing means connected to said outlet.

11. An apparatus for freezing ice cream or the like, including a casing, a hollow rotor disposed in said casing and having peripheral grooves closed at their outer sides by said casing, means for circulating a refrigerant through said rotor, means for delivering material into each of said grooves under pressure, means for rotating said rotor, scoops carried by said casing and projecting into said grooves for removing material therefrom during said rotation, and means associated with said scoops for preventing the ice cream from adhering to the inner surfaces of the scoops.

12. An apparatus for freezing ice cream or the like, including a casing, a hollow rotor disposed in said casing and having peripheral grooves closed at their outer sides by said casing, means for circulating a refrigerant through said rotor, means for delivering material into each of said grooves under pressure, means for rotating said rotor, scoops carried by said casing and projecting into said grooves for removing material therefrom during said rotation, and heating elements associated with said scoops.

CLARENCE W. VOGT.